(12) United States Patent
Phelan

(10) Patent No.: US 7,673,567 B2
(45) Date of Patent: Mar. 9, 2010

(54) TURBOFAN POWERED LOCOMOTIVE AND MONORAIL

(76) Inventor: James V. Phelan, 10110 Sepulveda Blvd., Mision Hills, CA (US) 91345

(*) Notice: Subject to any disclaimer, the term of this patent is extended or adjusted under 35 U.S.C. 154(b) by 0 days.

(21) Appl. No.: 11/726,530

(22) Filed: Mar. 22, 2007

(65) Prior Publication Data

US 2008/0184908 A1   Aug. 7, 2008

Related U.S. Application Data

(63) Continuation-in-part of application No. 11/490,794, filed on Jul. 21, 2006.

(51) Int. Cl.
A63G 21/00 (2006.01)

(52) U.S. Cl. .................................... 104/135

(58) Field of Classification Search .............. 105/26.05, 105/36, 61.5, 144; 104/134, 135, 138.1; 384/7, 49
See application file for complete search history.

(56) References Cited

U.S. PATENT DOCUMENTS

| | | | |
|---|---|---|---|
| 254,793 A | 3/1882 | Brigham | |
| 283,947 A | 8/1883 | Augspath | |
| 555,081 A | 2/1896 | Edmond | |
| 695,137 A | 3/1902 | Beecher | |
| 731,253 A | 6/1903 | Wentzel | |
| 1,042,066 A | 10/1912 | Zsinko | |
| 1,198,605 A | 9/1916 | Trent | |
| 1,652,461 A | 12/1927 | Snee | |
| 1,680,814 A | 8/1928 | Snee | |
| 2,469,432 A | 5/1949 | Cox | |
| 3,412,689 A | 11/1968 | Hawes | |
| 3,443,524 A * | 5/1969 | Schneider | 104/23.2 |
| 4,196,671 A | 4/1980 | Herring, Jr. et al. | |
| 4,575,145 A | 3/1986 | Wolfram et al. | |
| 4,703,697 A * | 11/1987 | Bell | 104/23.1 |
| 5,591,278 A | 1/1997 | Marcu | |
| 5,647,281 A * | 7/1997 | Kunczynski | 104/168 |
| 5,884,956 A | 3/1999 | Pasquin | |
| 6,880,469 B2 | 4/2005 | Frost | |
| 6,886,473 B2 | 5/2005 | Marchiori et al. | |

* cited by examiner

*Primary Examiner*—S. Joseph Morano
*Assistant Examiner*—Robert J McCarry, Jr.
(74) *Attorney, Agent, or Firm*—Colin P. Abrahams

(57) ABSTRACT

A track and linkage device for a locomotive designed to run on a track and powered by a turbofan engine comprises a track defining a channel having an open upper end and a plurality of ball bearings in the channel such that at least a portion of the ball bearings project through the open upper end of the channel. The ball bearings are at least partially coated with a material for reducing friction. A connector is associated with locomotive and has a slide surface thereon which slides on the ball bearings in the track. The slide surface includes a material on at least a portion of thereof for reducing friction when moving over the ball bearings.

12 Claims, 3 Drawing Sheets

US 7,673,567 B2

TURBOFAN POWERED LOCOMOTIVE AND MONORAIL

CROSS REFERENCE TO RELATED APPLICATIONS

This application is a continuation-in-part application of U.S. patent application Ser. No. 11/490,794 filed Jul. 21, 2006, which is incorporated herein by reference in its entirety.

FIELD AND BACKGROUND OF THE INVENTION

This invention relates to a turbofan powered locomotive and monorail arrangement. The invention also relates to vehicles such as a locomotive powered by a turbine engine, preferably, a turbofan engine, and riding on ball bearings which are preferably coated to reduce friction.

U.S. Pat. No. 4,703,697 (Bell) describes a transportation system, including concave central sections which extend laterally, and terminate in outwardly extending flanges. Lower wheels 38 cooperate with the tracks 18. A jet engine at the rear end of a coach 10 may be provided.

U.S. Pat. No. 3,443,524 (Schneider) teaches a transit system, where the track is described as generally comprising a pair of spaced, parallel grooves 14 located so as to project above the bottom of the track channel. Each passenger car has a cylindrical compartment resting on and secured to the carrier 22, having a flat bottom for engagement with track rollers. A power plant 38 may be of the jet propulsion type, located in the front or rear, as desired.

U.S. Pat. No. 1,652,461 (Snee) teaches a ball-bearing rail, including a rail constructed so as to reduce friction between the rails and the rolling stock. U.S. Pat. No. 555,081 (Emond) shows rails upon which a car runs, each rail being provided with a central, longitudinal V-shaped groove. Rollers are journaled in notches in the upper, side portion of the rails.

U.S. Pat. No. 283,947 (Augspath) includes a track with rollers arranged in horizontal series between the rails. U.S. Pat. No. 2,469,432 (Cox) teaches a super-speed elevated railway, comprising a continuous series of spaced-apart rollers, which are preferably provided with suitable anti-fiction bearings and which are of relatively small diameter so that very little power will be required to overcome their static inertia.

U.S. Pat. No. 731,253 (Wentzel) teaches a railroad rail, showing a groove which has placed therein a series of anti-fiction bearings. U.S. Pat. No. 3,412,689 (Hawes) teaches a monorail train, and has a single jet ejecting tube which is part of a jet propulsion means.

U.S. Pat. No. 4,575,145 (Wolfram) teaches a differential axle for a railroad car, and describes pressure plates disposed on the inboard and outboard ends of a sleeve, including opposed stainless steel thrust bearing surfaces contiguous to the annular side-faces of the wheel hub, which are surfaced with a Teflon® composite, bearing material bonded thereto. U.S. Pat. No. 4,196,671 (Herring) teaches a railway car including a surface area of the low friction surface. A side bearer comprises a phenolic resin impregnated cotton fabric on which layers of Teflon® fabric are imposed. U.S. Pat. No. 5,591,278 (Marcu) teaches wheels made of rigid polymer material, like high-impact nylon, which has uniformly distributed in it a solid lubricant-like Teflon® to facilitate rolling.

SUMMARY OF THE INVENTION

According to one aspect of the invention, there is provided a track and linkage device for a vehicle designed to run on a track and powered by a turbofan engine, the track and linkage device comprising: a track member defining a channel having an open upper end and a plurality of ball bearings in the channel such that at least a portion of the ball bearing project through the open upper end of the channel, the ball bearings being at least partially coated with a material for reducing friction; and a connector member associated with a vehicle, the connector member having a slide surface thereon which slides on the ball bearings in the track member, the slide surface including a material on at least a portion of thereof for reducing friction when moving over the ball bearings.

Preferably, the track member comprises an elongate track having a base and a pair of lateral, upwardly extending side walls defining the channel, the side walls being inwardly inclined so as to retain the ball-bearings within the channel. Further, the ball-bearings are substantially coated with a material for reducing friction, preferably Teflon®.

In one embodiment, the connector member comprises a connecter strip running along at least a portion of the length of the vehicle, the connector member having an upper surface connected to or part of the vehicle, and a lower surface which comprises the slide surface. The slide surface may be substantially coated with material for reducing friction.

Preferably, a pair of downwardly extending flanges depend from the lower surface of the connector member, the flanges being substantially adjacent an outer portion of the track member to stabilize the position of the vehicle on the track member.

In one form, a second track member substantially identical to the track member, the track member and second track member running substantially parallel to each other.

The connector member may comprise a plurality of wheels, the wheels running on two or more track members.

The vehicle may be a locomotive, or it may be a railroad car.

According to another aspect of the invention, there is provided a locomotive and track system, the locomotive being powered by a turbofan engine, the system comprising: a track member defining a channel having an open upper end and a plurality of ball bearings in the channel such that at least a portion of the ball bearing project through the open upper end of the channel, the ball bearings being at least partially coated with a material for reducing friction; and a connector member on the locomotive, the connector member having a slide surface thereon which slides on the ball bearings in the track member, the slide surface including a material on at least a portion of thereof for reducing friction when moving over the ball bearings.

Preferably, the track member comprises an elongate track having a base and a pair of lateral, upwardly extending side walls defining the channel, the side walls being inwardly inclined so as to retain the ball-bearings within the channel.

In one embodiment, the connector member comprises a connecter strip running along at least a portion of the length of the locomotive, the connector member having an upper surface connected to or part of the vehicle, and a lower surface which comprises the slide surface, the slide surface being substantially coated with material for reducing friction.

Further, a pair of downwardly extending flanges may be provided from the lower surface of the connector member, the flanges being substantially adjacent an outer portion of the track member to stabilize the position of the vehicle on the track member.

In another embodiment, a second track member substantially identical to the track member may be provided, the track member and second track member running substantially parallel to each other.

According to yet a further aspect of the invention, there is provided a locomotive powered by a turbofan engine, the locomotive comprising at least two pairs of wheels, each pair of wheels designed to run on a track, the wheels including a slide surface having a material thereon to reduce friction, and a track comprising a channel to receive a pair of wheels, the track including a channel coated at least in part with a material for reducing friction.

According to one aspect of the invention, there is provided a locomotive comprising a turbine engine for providing thrust to propel the locomotive over a surface such as a monorail; and a contact member formed on the locomotive which engages a monorail comprised of ball bearings, the contact member and ball bearings being comprised at least in part of a low friction material such as Teflon.

Preferably, two turbofan engines are provided and each of the turbofan engines is capable of delivering a variable thrust depending on the direction and/or speed of the vehicle. The turbofan engines may comprise at least one forward thrust turbofan engine mounted, for example only in a spaced relationship on the roof of the locomotive and positioned to move the locomotive in a forward direction, and a single rear thrust turbofan engine positioned to move the locomotive in a rearward direction. In one embodiment, the rear thrust turbofan engine is mounted between the pair of forward thrust turbofan engines.

In one aspect, a platform may be mounted on a roof of the locomotive, the platform being configured to received and hold the at least one turbofan engine. The platform may be movable relative to the roof of the locomotive, the platform being movable according to the direction of travel of the vehicle so that the turbofan engines mounted thereon are capable of selectively providing thrust substantially in the direction of movement of the vehicle.

In accordance with one aspect of the invention, the contact member is not used as a basis to propel the locomotive, so that the required traction between the contact member and the ball bearings on the monorail can be reduced. The propulsion preferably comes from a turbine engine, preferably a turbofan engine, which is mounted preferably on a movable platform on the top of the locomotive.

The invention may also comprise an additional backward or rear-thrust engine, designed to supply braking force. Such an engine may provide most of the braking force in an emergency stop, although the amount of braking force can of course be adjusted.

In accordance with one aspect of the invention, there is also provided a cornering aid structure and mechanism. Preferably, the cornering aid comprises a flange or projection which engages a portion of the monorail or track upon which the locomotive is traveling.

As regards the propulsion mechanism, a turbine is preferably used. Different types of turbine engines are known, and these include a turbojet, typically used in high-performance, commercial and other aircraft. Another type of turbine engine is the turboprop which produces two thrusts, one with the propeller and the other through exhaust.

Yet a further type is the turbofan engine, essentially a compromise between the turboprop and the turbojet engines. The turbofan includes a large internal propeller and streams of air flowing through the engine. The fan is typically smaller than a propeller and enclosed inside a duct or cowling for better controlled aerodynamics.

In accordance with the present invention, the turbofan type engine would be preferred for use on the locomotive of the invention.

Further, in accordance with the invention, the turbofan could one of two types, one powered electrically, either from a battery or a hybrid arrangement of an electric and fuel engine, or the engine may be powered in a conventional form using a jet or other fuel, or a fuel substitute such as ethanol instead of the jet fuel.

Since the turbofan engines may create considerable wind resistance, a wind screen may be provided in front of them. The middle part of such a wind screen, which may preferably be in front of the exhaust pipe of the backward-thrust turbofan engine, lowers automatically when the engine is activated, in order to allow the exhaust thrust a free path.

DETAILED DESCRIPTION OF THE DRAWINGS

Figure 1:
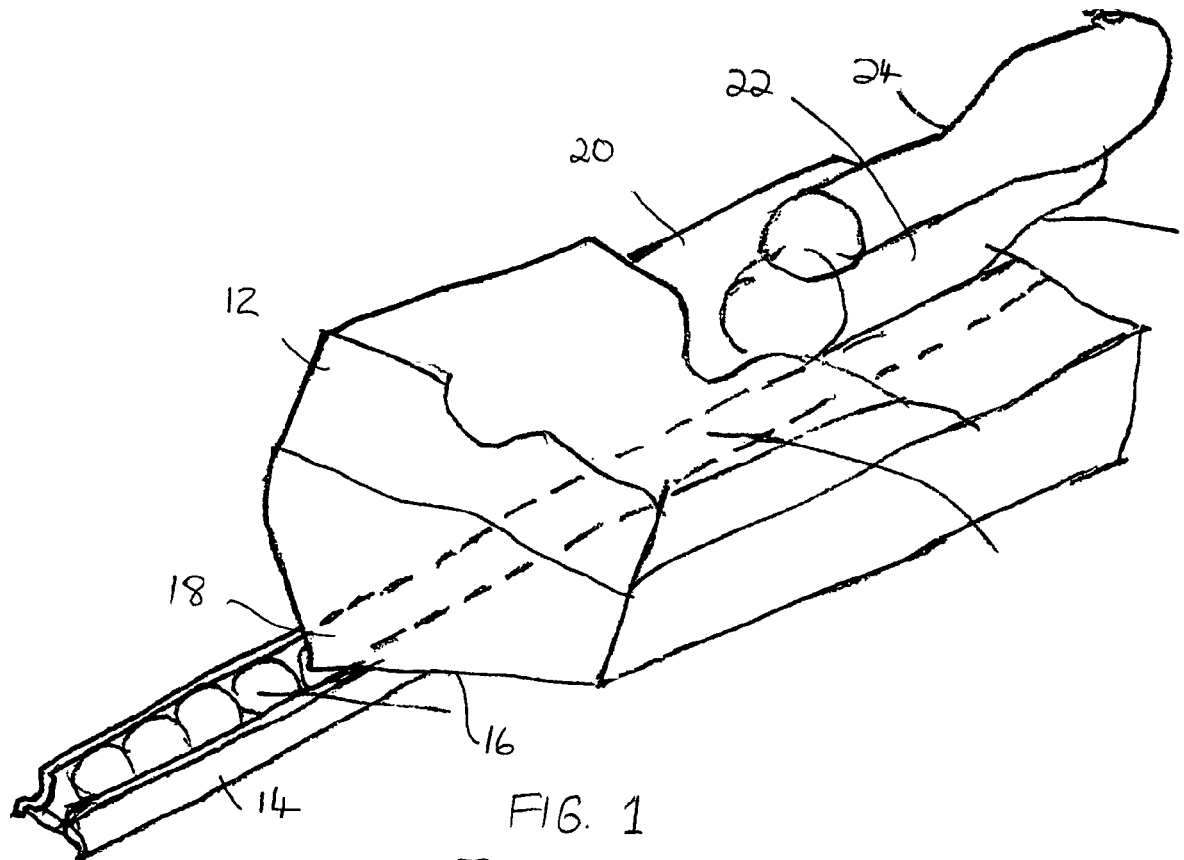
FIG. 1 is a schematic view of a part of a locomotive on a ball bearing containing single monorail track in accordance with one aspect of the invention.

In one aspect, the invention is for a linkage mechanism for a locomotive traveling on tracks, the tracks being either a monorail or dual rails, the locomotive having wheels or a contact area, preferably coated with a Teflon® or other friction-reducing material, and the rails including a string of ball-bearings upon which the wheels or contact member is located. Preferably, too, the ball-bearings are located and held within the tracks and are at least partially coated with a friction-reducing material, such as Teflon®.

In one embodiment of the invention, the locomotive has on the bottom or on the undersurface thereof a narrow strip preferably running down the center thereof for the length of the locomotive, although the narrow contact strip may be less than the length of the locomotive. Further, there may be a plurality of such narrow contact strips formed on the underside or bottom of the locomotive, each strip engaging the track, and more particularly the ball-bearings which are formed as part of the track.

Preferably, the track or monorail comprises a continuous string of ball-bearings, preferably coated with the friction-reducing material, such as Teflon®, and the ball-bearings are formed and held within the tracks such that they are trapped and cannot be dislodged, but have an upper surface which is exposed for receiving the contact strip member of the locomotive. Further, that the ball-bearings may be able to rotate within this track to enable reduced frictional locomotion of the locomotive along the monorail or track.

Preferably, when the locomotive sits on top of the monorail, the narrow compact strip is in contact with the string of ball-bearings, and is propelled down the monorail by power provided by a turbofan engine.

The monorail or track may be in various different forms. For example, if a monorail is provided, it may be comprised of two. parallel, sequential strings of ball-bearings coated with the friction-reducing material. The contact strip member on the underside of the locomotive is in contact with the top of the two substantially parallel strips of ball-bearings.

The arrangement described above will enhance the ability of the locomotive to more easily roll on the track since the Teflon®-coated strip is riding on Teflon®l-coated ball-bearings. The forward thrust turbofan is preferably mounted on top of the locomotive, and provides the necessary force and power to propel the locomotive along the monorail or track. When two strings of ball-bearings are provided, an increased level of stability may be achieved.

In another aspect of the invention, there may also be provided a rearward thrust turbofan, which may also be mounted on top of the locomotive, and may be adjacent the forward thrust turbofan. The rearward thrust turbofan provides power both for the purposes of braking the locomotive and slowing it down, and for when the locomotive needs to reverse or move in a backward direction.

It will of course be appreciated that all passenger and/or freight cars which the locomotive pulls will also preferably have the necessary low-friction strip or contact member at the bottom thereof, which would typically be identical to or similar in construction and design to those on the locomotive which provides the motive power.

The present invention has the advantage of providing a reduction in friction between the locomotive and the monorail, and also provides stability and safety for riding on a monorail with two strings of ball-bearings. While two strings of ball-bearings might be a preferred and more stable arrangement, the invention may have only one string of such ball-bearings, or may, indeed, have three or more, depending upon the type of construction which may be suited to a particular situation.

The power of the turbofan motor and the low-friction contact arrangement may well enable the locomotive to move at high speeds, depending upon the load, and the local factors such as corners, grades and surroundings.

Reference is now made to the enclosed Figures in describing specific examples and representations of preferred embodiments of the invention. While different forms of the invention are shown in the drawings, it will be appreciated that the invention is not limited to the specific construction illustrated herein.

Figure 2:
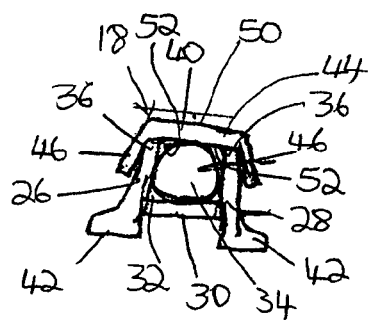
FIG. 2 is a schematic front view of the ball bearing containing track as shown in FIG. 1 with the contact member of the locomotive thereon.

With reference now made to FIGS. 1 and 2 of the drawings, these figures show, in schematic form, a perspective and front view respectively of one possible arrangement of a locomotive and monorail linkage system in accordance with an aspect of this invention. In FIG. 1, a locomotive generally indicated by the reference numeral 12 moves over a monorail 14. The locomotive 12 is, of course, shown very much in a schematic form, and is meant to represent either a locomotive which powers and pulls carriages and cars, or it may equally be one of the cars pulled by the power engines, to be described below.

The locomotive 12 has a lower surface 16, and the lower surface 16 includes a contact member 18, seen in better detail in FIG. 2 of the drawings, as will be described. The contact member 18 is fixed to the lower surface of the locomotive 12, and forms the mechanism by means of which the locomotive 12 travels over, or rolls over, the monorail 14.

The locomotive 12 also has an upper surface 20, and a forward-thrust turbofan motor 22 is mounted on this upper surface 20. One forward-thrust turbofan motor 22 is shown in FIG. 1 of the drawings, but in other embodiments of the invention, two or more such motors 22 may be provided, depending upon the power needed to move the locomotive over the monorail 14.

Also provided is a rear-thrust turbofan 24, which provides thrust in the opposite direction to that of the turbofan 22. The rear-thrust turbofan 24 has the dual purpose of both functioning as a braking or slowing system for the locomotive 12, as well as a power source for moving the locomotive 12 in a reverse direction, or a direction opposite to that of the forward-thrust turbofan 22.

Reference is now made to the monorail 14 which forms a track upon which the locomotive 12 moves. The monorail 14 has lateral walls 26 and 28 as well as a base wall 30. The lateral walls 26 and 28, and base wall 30 define a channel 32, and formed within the channel 32 are a plurality of sequentially arranged ball-bearings 34. Upon review of FIG. 2 particularly, it will be seen that the upper edges 36 of the lateral walls 26 and 28 respectively, are slightly below the upper arc 40 of the ball-bearing 34. In effect, therefore, the ball-bearings 34 project slightly above the level defined by the lateral walls 26 and 28.

It will be seen that the monorail 14 also includes legs 42 upon which the entire structure is mounted or otherwise secured to a base or substrate, in a conventional fashion. Other mounting arrangements are of course within the scope of the invention.

Preferably, the ball-bearings 34 are covered with a friction-reducing material, such as Teflon®, to enhance the effective rolling capacity of the locomotive thereover.

With reference to FIG. 2 of the drawings, it will also be seen that the contact member 18 comprises a horizontal plate 44, and a pair of laterally depending flanges 46. The horizontal plate 44 has an upper surface 50 which is attached to, or forms part of the locomotive 12, and a lower surface 52. The lower surface 52 is, in use, supported by the series of ball-bearings 34, and rides along the plurality of ball-bearings formed as part of the monorail 14. The flanges 46 and 48 are located outside the lateral walls 26 and 28, and provide some stability to the locomotive to ensure that it remains firmly centered or positioned on the monorail without any undesired lateral movement.

Figures 3, 4:
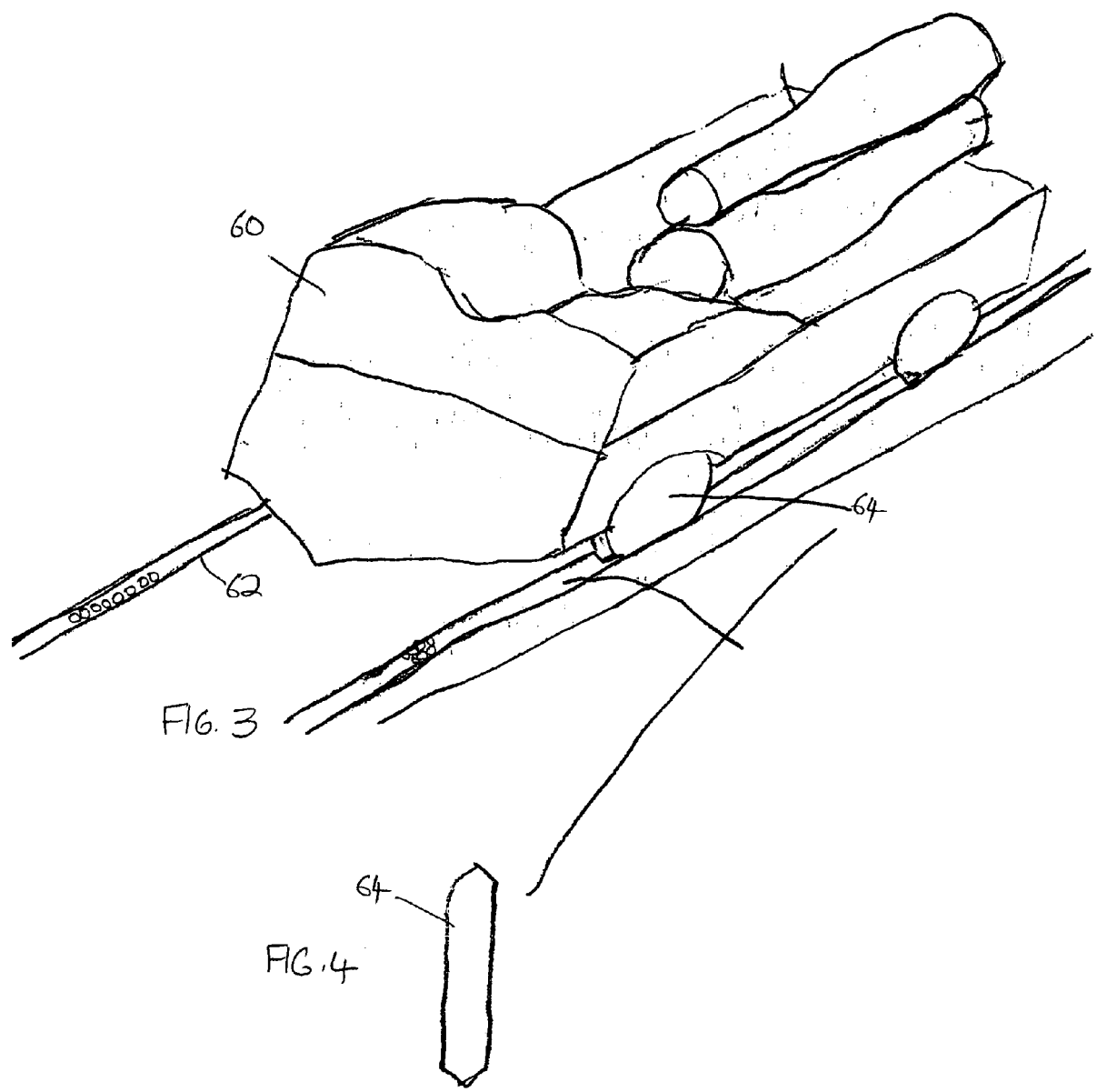
FIG. 3 is a schematic perspective view of a locomotive having contact members in the form of wheels which ride in tracks having ball bearings.
FIG. 4 is a front view of a wheel used on a locomotive shown in FIG. 3 of the drawings.
Figure 5:
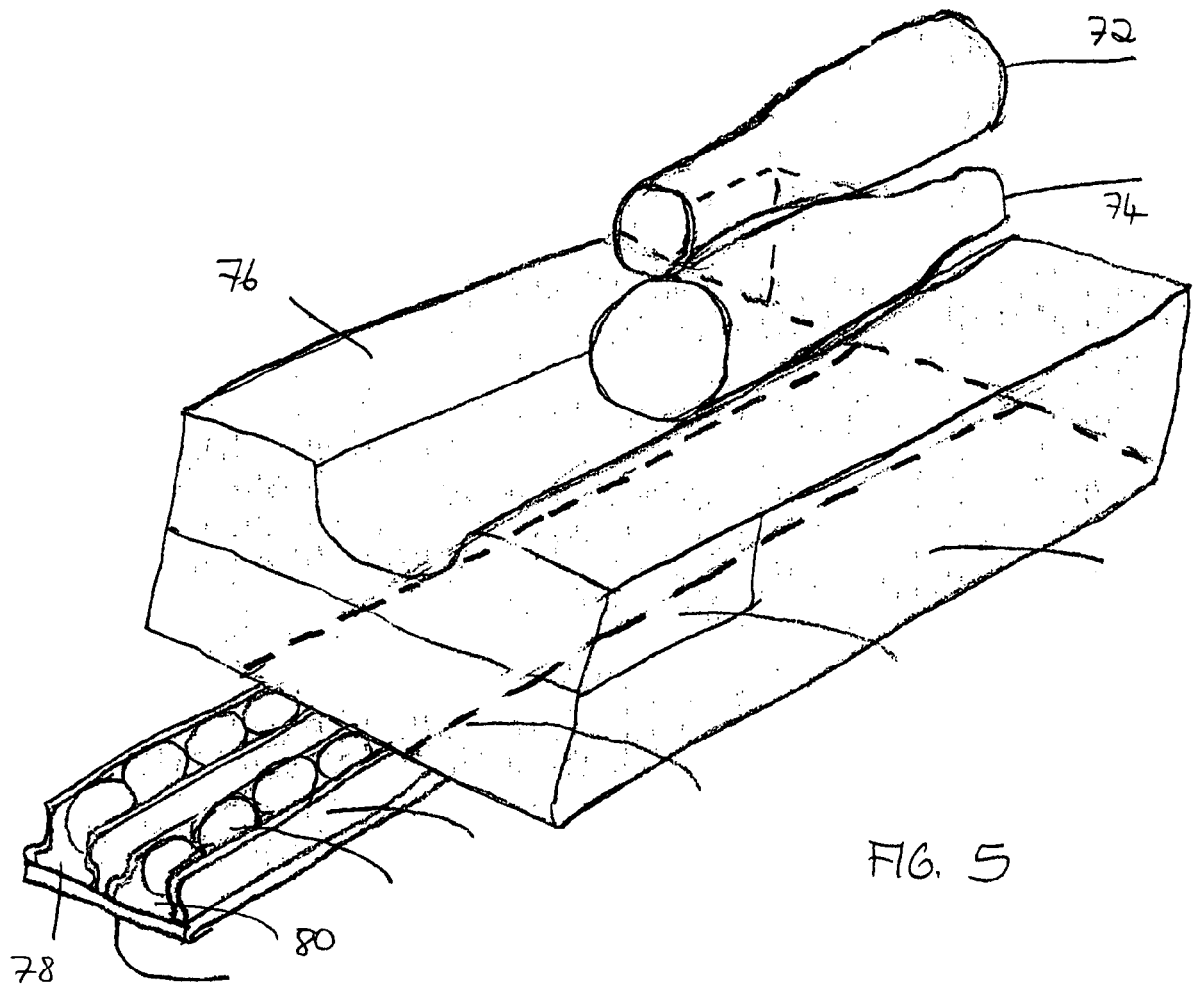
FIG. 5 is a schematic perspective view of a locomotive having a contact member riding on dual rails each rail having ball bearing therein for receiving the contact member.

FIGS. 3 and 4 of the drawings show a slightly different version of the invention. In the perspective schematic representation shown in FIG. 3 of the drawings, a locomotive 60 rides on dual tracks 62. The locomotive itself has wheels 64 which ride within the tracks, and the tracks may have a series of ball-bearings upon which the wheels roll. In one form, however, the tracks may have V-shaped channel, and the wheels a corresponding V-shaped projection, both of which are coated with a friction-reducing material, such as Teflon®, to enhance the ability of the locomotive to roll, and reduce friction between the two.

Figure 6:
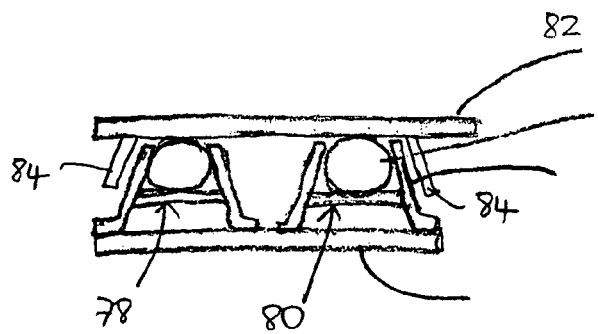
FIG. 6 is a schematic front view of the contact member and rails of the arrangement shown in FIG. 5 of the drawings.

FIG. 6 of the drawings shows a further embodiment of the invention. In FIG. 6, there is shown a locomotive generally indicated by the reference numeral 70, in schematic form, having a forward-thrust turbofan motor 72 and a rearward-thrust turbofan motor 74 which operate in much the same way as has already been described with reference to FIG. 1 of the drawings.

In the embodiments shown in FIGS. 6 and 7, however, a pair of substantially parallel monorail tracks 78 and 80 are formed, and the locomotive 70 simultaneously rides upon both, as will be described.

In the front cross-sectional view shown in FIG. 7 of the drawings, it will be seen that each of the monorails 78 and 80 is of generally similar construction to the single monorail 18, shown in FIG. 2 of the drawings, and the details will therefore not be repeated. In each of the monorails 78 and 80, a series of ball-bearings are sequentially arranged, and the ball-bearings project slightly above each of the lateral walls of each monorail so that an undersurface of a contact member or strip, shown as reference numeral 82 in FIG. 7, rides upon both sets of ball-bearings.

In addition, the contact member 82 has near each end thereof a depending flange 84 which almost abuts, or is closely adjacent to, the outer wall of each monorail 78 and 80, and enhances the stability, particularly the stability of the locomotive 70 when on the monorail when moving through curves or cornering on the track.

In normal operation, the weight of the locomotive will keep the contact member or strip generally centered on the tops of the two strings of ball-bearings, as illustrated in FIGS. 6 and 7. However, in a curve or corner, whether extreme or gradual, the locomotive may tend to slide a little to the side opposite to the turn. In order to counter such slide, the two guidance flanges 84 are placed as depending structures from the contact member 82, and would not in normal operation touch the monorails, thereby providing another source of friction. However, in case of sliding, the flanges 84 will engage the walls of the monorail, and stop or contain the slide. After the turn, the contact strip would once more be centered on the ball-bearings and the flanges would not be in contact with the monorail. Preferably, the flanges are also coated at least in part with a friction-reducing material, such as Teflon®, so that when they do come into contact with the monorail, friction is kept to a minimum.

The invention is not limited to the precise constructional details described and illustrated herein.

The invention claimed is:

1. A track and linkage device for a vehicle designed to run on a track and powered by a turbofan engine, the track and linkage device comprising:
    a track member defining a channel having an open upper end and a plurality of ball bearings in the channel such that at least a portion of the ball bearings project through the open upper end of the channel, the ball bearings being at least partially coated with a material for reducing friction; and
    a connector member associated with a vehicle, the connector member having a slide surface thereon which slides on the ball bearings in the track member, the slide surface including a material on at least a portion of thereof for reducing friction when moving over the ball bearings, the connector member comprising a connecter strip running along at least a portion of the length of the vehicle, the connector member having an upper surface connected to or part of the vehicle, and a lower surface which comprises the slide surface, the connector member having a pair of downwardly extending flanges from the lower surface of the connector member, the flanges being substantially adjacent an outer portion of the track member to stabilize the position of the vehicle on the track member.

2. A track and linkage device as claimed in claim 1 wherein the track member comprises an elongate track having a base and a pair of lateral, upwardly extending side walls defining the channel, the side walls being inwardly inclined so as to retain the ball-bearings within the channel.

3. A track and linkage device as claimed in claim 1 wherein the ball-bearings are substantially coated with a material for reducing friction.

4. A track and linkage device as claimed in claim 1 wherein the slide surface is substantially coated with material for reducing friction.

5. A track and linkage device as claimed in claim 1 further comprising a second track member substantially identical to the track member, the track member and second track member running substantially parallel to each other.

6. A track and linkage device as claimed in claim 1 wherein the connector member comprises a plurality of wheels, the wheels running on two or more track members.

7. A track and linkage device as claimed in claim 1 wherein the vehicle is a locomotive.

8. A track and linkage device as claimed in claim 1 wherein the vehicle is a railroad car.

9. A locomotive and track system, the locomotive being powered by a turbofan engine, the system comprising:
    a track member defining a channel having an open upper end and a plurality of ball bearings in the channel such that at least a portion of the ball bearing project through the open upper end of the channel, the ball bearings being at least partially coated with a material for reducing friction; and
    a connector member on the locomotive, the connector member having a slide surface thereon which slides on the ball bearings in the track member, the slide surface including a material on at least a portion of thereof for reducing friction when moving over the ball bearings, the connector member comprising a connecter strip running along at least a portion of the length of the vehicle, the connector member having an upper surface connected to or part of the vehicle, and a lower surface which comprises the slide surface, the connector member having a pair of downwardly extending flanges from the lower surface of the connector member, the flanges being substantially adjacent an outer portion of the track member to stabilize the position of the vehicle on the track member.

10. A track and linkage device as claimed in claim 9 wherein the track member comprises an elongate track having a base and a pair of lateral, upwardly extending side walls defining the channel, the side walls being inwardly inclined so as to retain the ballbearings within the channel.

11. A track and linkage device as claimed in claim 9 wherein the ball-bearings are substantially coated with a material for reducing friction.

12. A track and linkage device as claimed in claim 9 further comprising a second track member substantially identical to the track member, the track member and second track member running substantially parallel to each other.

* * * * *